(12) United States Patent
Jia et al.

(10) Patent No.: US 10,802,391 B2
(45) Date of Patent: Oct. 13, 2020

(54) METHOD OF STRIPPING FILMS WHICH ARE STUCK TOGETHER WITHOUT DAMAGE

(71) Applicant: SHAANXI NORMAL UNIVERSITY, Xi'an, Shaanxi (CN)

(72) Inventors: Zhihui Jia, Shaanxi (CN); Yuhu Li, Shaanxi (CN)

(73) Assignee: SHAANXI NORMAL UNIVERSITY, Xi'an, Shaanxi (CN)

( * ) Notice: Subject to any disclaimer, the term of this patent is extended or adjusted under 35 U.S.C. 154(b) by 248 days.

(21) Appl. No.: 16/074,213

(22) PCT Filed: Aug. 18, 2017

(86) PCT No.: PCT/CN2017/098100
§ 371 (c)(1),
(2) Date: Jul. 31, 2018

(87) PCT Pub. No.: WO2018/129923
PCT Pub. Date: Jul. 19, 2018

(65) Prior Publication Data
US 2019/0332002 A1    Oct. 31, 2019

(30) Foreign Application Priority Data
Jan. 12, 2017   (CN) .......................... 2017 1 0022969

(51) Int. Cl.
*B32B 43/00*     (2006.01)
*G03D 15/04*    (2006.01)
*B32B 38/10*     (2006.01)

(52) U.S. Cl.
CPC ........... *G03D 15/043* (2013.01); *B32B 38/10* (2013.01); *B32B 43/006* (2013.01); *Y10T 156/1153* (2015.01); *Y10T 156/1911* (2015.01)

(58) Field of Classification Search
CPC . B32B 38/10; B32B 43/006; Y10T 156/1153; Y10T 156/1911
See application file for complete search history.

(56) References Cited

U.S. PATENT DOCUMENTS 10,444,630 B2 * 10/2019  Jia ........................... G03D 15/00
2016/0318296 A1 * 11/2016  Park ...................... B32B 43/006

* cited by examiner

*Primary Examiner* — Mark A Osele
*Assistant Examiner* — Nickolas R Harm

(57) ABSTRACT

A method of stripping films which are stuck together without damage is disclosed. The whole reel of films which are stuck together is placed in a sealing device with outlet valves. Liquid nitrogen is added at a bottom of the sealing device. The films are stripped off by a flow of gas through gaps between the layers of the films while the vaporization of liquid nitrogen. The present invention adopts a natural force of liquid nitrogen vaporization to strip the films, which does not compromise the PH value, the dimensional performance and the mechanical performance of the films. The films are stripped off without damage. The conventional method of stripping the films causes the fragile film to break off or the image layer with a decreased combing power to detach. The present invention has the advantages of simple operation, low cost and good promotion value.

4 Claims, No Drawings

METHOD OF STRIPPING FILMS WHICH ARE STUCK TOGETHER WITHOUT DAMAGE

CROSS REFERENCE OF RELATED APPLICATION

This is a U.S. National Stage under 35 U.S.C 371 of the International Application PCT/CN2017/098100, filed Aug. 18, 2017, which claims priority under 35 U.S.C. 119(a-d) to CN 201710022969.2, filed Jan. 12, 2017.

BACKGROUND OF THE PRESENT INVENTION

Field of Invention

The present invention relates to image file protection and recovery field, and more particularly to a method of stripping films with bonded cellulose acetate.

Description of Related Arts

The acetic acid syndrome is a common disease of cellulose acetate films, which is caused by cellulose acetate hydrolysis. The acetic acid syndrome is a cancer for the cellulose acetate films, which severely threaten the safe of the film. The film emits a strong odor of acetic acid. White crystals precipitate from a surface of the film. The films are twisted and distorted or even the emulsion layer is detached or liquefied. The whole reel of the film is bonding to a whole piece and the image is lost. The acetic acid syndrome damages the mechanical stress of the film, geometric dimensioning of the film, image recorded on the film and sound recorded on the film to a certain extent. Especially when the whole reel of film is bonded together, the film is almost useless. The reasons for the film bonding together are as below: (1) when the gelatin of the emulsion layer of the film meets acids (such as the acetic acid generated during the hydrolysis of the cellulose acetate films), alkalis and enzymes, the gelatin of the emulsion layer hydrolyses to an amino acid with simple structure and turns from hydrophobic to hydrophilic. The glue solution is gradually forming and causing bonding; (2) the precipitation of plasticizer TPP (triphenyl phosphate) causes bonding.

The bonding complicates the recovery of the film. If the film is stripped directly, the fragile film breaks easily or the emulsion layer with a decrease in the combining power detaches from the film. Conventional method is unable to strip the film without damage. To develop a method for stripping the film which is stuck together without damage is required for the recovery and protection of films.

SUMMARY OF THE PRESENT INVENTION

An object of the present invention is to provide a method of stripping the films which are stuck together without damage.

The present invention is realized by the following technical solution:

A method of striping films which are stuck together without damage, comprising steps of adding liquid nitrogen into a sealing device with safety valves; hanging the films which are stuck together inside the sealing device horizontally; setting the safety valves to automatically discharge gas when a pressure inside the sealing device reaches 0.10-0.50 MPa; vaporizing the liquid nitrogen added in the sealing device for 30 to 150 minutes; taking out the films when a temperature returns to a room temperature; completing stripping of the films.

The safety valves automatically discharge gas when the pressure inside the sealing device reaches 0.15-0.20 MPa.

A distance between a bottom of the films which are stuck together and an initial liquid nitrogen surface is 0.5-2 cm.

A whole reel of films which are stuck together is placed inside a sealing device with safety valves. The liquid nitrogen is added at the bottom of the sealing device. During the process of vaporizing the liquid nitrogen, the difference between the CTE (coefficient of thermal expansion) of the film base and emulsion layer forms millipores and cracks between the film base and the emulsion layer of the bonded films under low temperature. The vaporized liquid nitrogen flows through the cracks between layers of the bonded film. The nitrogen is released from the outlet valve when the pressure inside the sealing device reaches a certain point. The stripping of the film is completed when the liquid nitrogen inside the sealing device is fully vaporized and the temperature inside the sealing device returns to room temperature. The whole process adopts natural force of liquid nitrogen vaporization to strip the film without damage. The time for processing the film is adjustable according to the bonding situation of the film.

The present invention solves the problem of the image layer detaching from the film while people striping the fragile bonded films. The time for stripping the film is adjustable according to the bonding situation of the film. The PH value of the film, the dimensional stability and the mechanical performance of the film is not compromised. The films are able to be stripped without damage. The operation is simple, the cost is low and the present invention has good promotion value.

DETAILED DESCRIPTION OF THE PREFERRED EMBODIMENT

Referring to the drawings, according to a preferred embodiment of the present invention is illustrated. The embodiments are not a limitation for the present invention.

Embodiment 1

The liquid nitrogen is added into the sealing device with safety valves on the top lid. The sealing device is a stainless steel barrel with a diameter of 15 cm and a capacity of 1.5 L. The liquid nitrogen reaches a height of 5 cm. The bonded cellulose acetate films are hung is in the sealing device horizontally. The distance between the bottom of the films and the initial liquid surface of the liquid nitrogen is 1 cm. The safety valves automatically discharge gases when the pressure inside the sealing device reaches 0.17 MPa. The films are taken out when the liquid nitrogen fully vaporized (about 50 minutes) and a temperature returns to a room temperature. The films are successfully stripped and the stripped films are spread freely.

Embodiment 2

The liquid nitrogen is added into the sealing device with safety valves on the top lid. The sealing device is a stainless steel barrel with a diameter of 35 cm and a capacity of 15 L. The liquid nitrogen reaches a height of 5 cm. The bonded cellulose acetate films are hung in the sealing device horizontally. The distance between the bottom of the films and the initial liquid surface of the liquid nitrogen is 0.5 cm. The safety valves automatically discharge gases when the pressure inside the sealing device reaches 0.10 MPa. The films are taken out when the liquid nitrogen fully vaporized (about 30 minutes) and a temperature returns to a room temperature. The films are successfully stripped.

Embodiment 3

The liquid nitrogen is added into the sealing device with safety valves on the top lid. The sealing device is a stainless steel barrel with a diameter of 35 cm and a capacity of 15 L. The liquid nitrogen reaches a height of 8 cm. The bonded cellulose acetate films are hung in the sealing device horizontally. The distance between the bottom of the films and the initial liquid surface of the liquid nitrogen is 1 cm. The safety valves automatically discharge gases when the pressure inside the sealing device reaches 0.20 MPa. The films are taken out when the liquid nitrogen fully vaporized (about 40 minutes) and a temperature returns to a room temperature. The films are successfully stripped.

Embodiment 4

The liquid nitrogen is added into the sealing device with safety valves on the top lid. The sealing device is a stainless steel barrel with a diameter of 35 cm and a capacity of 15 L. The liquid nitrogen reaches a height of 10 cm. The bonded cellulose acetate films are hung in the sealing device horizontally. The distance between the bottom of the films and the initial liquid surface of the liquid nitrogen is 2 cm. The safety valves automatically discharge gases when the pressure inside the sealing device reaches 0.50 MPa. The films are taken out when the liquid nitrogen fully vaporized (about 60 minutes) and a temperature returns to a room temperature. The films are successfully stripped.

In order to illustrate the benefits of the present invention, the inventor test the film properties with different processing time by adopting the method described in the embodiment 1.

1 the Difference in the pH Value.

The pH value is tested by adopting the film acidity testing method developed by the Manchester industrial school and the Eastman Kodak company. The test comprises the following steps: a) weighing 1 g of the sample film with an accuracy of 0.01 g; b) cutting the sample film with the emulsion layer and all the coating layers to small blocks of 25 mm and putting the small blocks into 100 ml of deionized water; c) soaking the film in water of 38 degrees and stirring continuously for 24 hours; d) filtering the solution and removing the film granules (especially the emulsion granules, because the gelatin is amphoteric and affects the test result); e) testing the sample film with a pH meter; wherein the relative pH accuracy of the pH meter is +/−0.01; averaging the results after the parallel determination of three samples for the same film. The test results are shown in the table 1.

TABLE 1 the difference in pH value before and after the processing

| Processing sequence | Processing time/min | | | | | |
|---|---|---|---|---|---|---|
| | 0 | 30 | 60 | 90 | 120 | 150 |
| 1 | 4.00 | 4.05 | 3.98 | 3.97 | 3.99 | 4.03 |
| 2 | 4.14 | 3.96 | 4.03 | 3.92 | 4.10 | 4.11 |
| 3 | 3.96 | 4.08 | 4.08 | 4.10 | 4.08 | 3.98 |
| Average value | 4.03 | 4.03 | 4.03 | 4.00 | 4.06 | 4.04 |

As illustrated in the table 1, with an increasing in the processing time, the pH value of the film before and after the processing is basically unchanged, which proves that the processing time does not affect the acidity of the films 2 the Difference in the Dimensional Stability of the Film.

The moisture content of the film is for a measurement of the water and the volatile component in the film and the film base, which is also an indicator for the dimensional stability of the film. The present test adopts a standard method for determining the moisture content of the film listed in Chinese industry standard HG/T 3558-1988. The method comprises the following steps: taking a sample film about 1 g; placing the sample film inside a weighing bottle which is pre-dried to a constant weight; putting the lid on the weighing bottle; weighing with an analytical balance; opening the lid and drying the film inside a constant-temperature dry box of 70 degrees for 3 hours; putting the lid on and placing the weighing bottle inside a drier before weighing again. The formula is as below:

moisture content %=(weight of the sample film before dried-weight of the sample film after dried)*100/weight of the sample film before dried

TABLE 2 dimensional stability after processing

| Processing item | Processing time/min | | | | |
|---|---|---|---|---|---|
| | 30 | 60 | 90 | 120 | 150 |
| Weight of sample film before dried(g) | 1.0750 | 1.0866 | 1.0434 | 1.1876 | 1.0966 |
| Weight of sample film after dried(g) | 1.0664 | 1.0776 | 1.0342 | 1.1775 | 1.0873 |
| Δm(g) | 0.0086 | 0.0090 | 0.0092 | 0.0101 | 0.0093 |
| moisture content (%) | 0.80 | 0.83 | 0.88 | 0.85 | 0.83 |

As illustrated in the table 2, with an increasing in the processing time, the moisture content of the film before and after the processing is basically unchanged, which proves that the processing time does not affect the dimensional stability of the films. The moisture content refers to the water and volatile component content, which is an indicator for the dimensional stability of the film base in production.

3 the Difference in the Mechanical Stress of the Film.

The difference in the mechanical stress of the film is indicated by the tensile strength and the folding endurance of the film.

The test for the folding endurance comprises the following steps: cutting the sample film into strips 150 mm*15 mm; preparing for at least 15 strips; setting the tension of the folding tester which is controlled be a computer to 4.9N; testing the folding endurance; recording the number of the double fold; testing 10 strips for each sample group; averaging the test results. The tests results are listed in the table 3.

TABLE 3 the difference in the folding endurance before and after the processing

| Processing sequence | Processing time/min | | | | | |
|---|---|---|---|---|---|---|
| | 0 | 30 | 60 | 90 | 120 | 150 |
| 1 | 1.08 | 1.08 | 1 | 1 | 0.95 | 0.9 |
| 2 | 0.95 | 1.1 | 1.11 | 0.95 | 1.11 | 1.1 |
| 3 | 1.08 | 1.08 | 1.08 | 1.08 | 1.00 | 1.08 |

TABLE 3-continued the difference in the folding endurance
before and after the processing

| | Processing time/min | | | | | |
|---|---|---|---|---|---|---|
| Processing sequence | 0 | 30 | 60 | 90 | 120 | 150 |
| 4 | 1.04 | 0.95 | 0.9 | 1.11 | 1.00 | 0.95 |
| 5 | 0.95 | 0.9 | 1.08 | 1.11 | 1.04 | 0.9 |
| 6 | 1.00 | 1 | 0.95 | 1.04 | 1.00 | 1.11 |
| 7 | 0.95 | 1 | 0.96 | 0.9 | 0.95 | 1 |
| 8 | 1.00 | 0.95 | 1.08 | 1 | 1.11 | 0.95 |
| 9 | 1.00 | 1.08 | 1 | 1.11 | 1.15 | 1.08 |
| 10 | 1.00 | 1 | 1.04 | 1 | 1.00 | 1.11 |
| Average value | 1.01 | 1.01 | 1.02 | 1.03 | 1.03 | 1.02 |

The test for the tensile strength comprises the following steps: cutting the sample film into strips 150 mm*15 mm; preparing for at least 15 strips; testing the tensile stress of the samples by a pendulum tensile strength tester; testing 10 strips for each sample group; averaging the test results and calculating the tensile strength with the below formula:

$$S = \frac{F}{L_w}$$

wherein S denotes the tensile strength, kN/m; F denotes the tensile stress, N; $L_w$ denotes the width of the sample, mm. The test results are illustrated in the table 4.

TABLE 4 difference in the tensile strength of the
film before and after the processing

| | Processing time/min | | | | | |
|---|---|---|---|---|---|---|
| Processing sequence | 0 | 30 | 60 | 90 | 120 | 150 |
| 1 | 78.0 | 78.2 | 77.8 | 77.8 | 83.4 | 75.8 |
| 2 | 79.6 | 78.4 | 78.4 | 80.4 | 82.6 | 80.4 |
| 3 | 82.4 | 81.6 | 85.6 | 82 | 80.1 | 78.9 |
| 4 | 80.2 | 83.0 | 77.4 | 79 | 82 | 80.2 |
| 5 | 77.0 | 78.4 | 76.8 | 78.4 | 75 | 85.8 |
| 6 | 80.9 | 78.4 | 77.8 | 76.8 | 78.4 | 82.6 |
| 7 | 81.1 | 83.8 | 80.5 | 80.3 | 77 | 79.4 |
| 8 | 80.0 | 77.8 | 84.5 | 86.6 | 82 | 76.4 |
| 9 | 78.9 | 79.0 | 86 | 80.8 | 82.2 | 83.6 |

TABLE 4-continued difference in the tensile strength of the
film before and after the processing

| | Processing time/min | | | | | |
|---|---|---|---|---|---|---|
| Processing sequence | 0 | 30 | 60 | 90 | 120 | 150 |
| 10 | 82.3 | 80.8 | 78.4 | 78.8 | 78.6 | 84.4 |
| Average value | 80.0 | 79.9 | 80.3 | 80.1 | 80.1 | 80.7 |

As illustrated in the table 3 and table 4, with an increasing in the processing time, the folding endurance and the tensile strength of the film before and after the processing is basically unchanged, which proves that the processing time does not affect the dimensional stability of the films.

The inventor test the cellulose acetate films made in China during 1980s. A reel of films is processed by parallel determination for 150 minutes. The research shows the liquid nitrogen does not compromise the pH value, the dimensional stability and the mechanical stress of the films. The liquid nitrogen is able to strip the bonded films without damage.

What is claimed is:

1. A method of stripping films which are stuck together without damage, comprising steps of adding liquid nitrogen into a sealing device with safety valves; hanging the films which are stuck together inside the sealing device horizontally; setting the safety valves to automatically discharge gas when a pressure inside the sealing device reaches 0.10-0.50 MPa; vaporizing the liquid nitrogen added in the sealing device for 30 to 150 minutes; taking out the films when a temperature returns to a room temperature; completing stripping of the films.

2. The method of stripping the films which are stuck together without the damage, as recited in claim 1, wherein the safety valves automatically discharge the gas when the pressure inside the sealing device reaches 0.15-0.20 MPa.

3. The method of stripping the films which are stuck together without the damage, as recited in claim 1, wherein a distance between a bottom of the films which are stuck together and an initial liquid nitrogen surface is 0.5-2 cm.

4. The method of stripping the films which are stuck together without the damage, as recited in claim 2, wherein a distance between a bottom of the films which are stuck together and an initial liquid nitrogen surface is 0.5-2 cm.

* * * * *